US012616999B2

(12) United States Patent
Masuda et al.

(10) Patent No.: US 12,616,999 B2
(45) Date of Patent: May 5, 2026

(54) ULTRASONIC SENSOR

(71) Applicant: Panasonic Intellectual Property Management Co., Ltd., Osaka (JP)

(72) Inventors: Tomoki Masuda, Osaka (JP); Yudai Ishizaki, Kyoto (JP); Hidetomo Nagahara, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 945 days.

(21) Appl. No.: 17/759,531

(22) PCT Filed: Feb. 8, 2021

(86) PCT No.: PCT/JP2021/004507

§ 371 (c)(1),
(2) Date: Jul. 27, 2022

(87) PCT Pub. No.: WO2021/176954

PCT Pub. Date: Sep. 10, 2021

(65) Prior Publication Data

US 2023/0077798 A1 Mar. 16, 2023

(30) Foreign Application Priority Data

Mar. 3, 2020 (JP) ................................ 2020-035467

(51) Int. Cl.
*B06B 1/00* (2006.01)
*B06B 1/06* (2006.01)
*H04R 17/00* (2006.01)

(52) U.S. Cl.
CPC ............ *B06B 1/067* (2013.01); *H04R 17/00* (2013.01)

(58) Field of Classification Search
CPC .......... B06B 1/067; H04R 17/00; H02N 2/00; H02N 2/001
(Continued)

(56) References Cited

U.S. PATENT DOCUMENTS 4,523,122 A * 6/1985 Tone ..................... G10K 11/02 73/644
2003/0166745 A1 9/2003 Takahashi et al.
(Continued)

FOREIGN PATENT DOCUMENTS

EP 0 119 855 6/1992
JP 2003-259491 9/2003
(Continued)

OTHER PUBLICATIONS

Extended European Search Report issued Jul. 4, 2023 in corresponding European Patent Application No. 21765149.6.
(Continued)

*Primary Examiner* — Julio C. Gonzalez
(74) *Attorney, Agent, or Firm* — Wenderoth, Lind & Ponack, L.L.P.

(57) ABSTRACT

An ultrasonic sensor that is less affected by humidity change is obtained. Ultrasonic sensor (1) is configured by sequentially laminating piezoelectric element (2), metal housing (3), first acoustic matching layer (4), and second acoustic matching layer (5). First acoustic matching layer (4) adjacent to piezoelectric element (2) with metal housing (3) interposed therebetween includes a thermoplastic resin and an inorganic filler. The weight fraction of the inorganic filler in first acoustic matching layer (4) is set to less than or equal to 30% and the weight fraction of the hollow structure filler in the inorganic filler is set to less than or equal to 50%.

6 Claims, 2 Drawing Sheets

(58) Field of Classification Search
USPC .................... 310/334, 311, 322, 323.12, 327
See application file for complete search history.

(56) References Cited

U.S. PATENT DOCUMENTS

| | | | | |
|---|---|---|---|---|
| 2004/0113522 | A1* | 6/2004 | Nagahara | G10K 11/02 310/326 |
| 2007/0161903 | A1 | 7/2007 | Yamashita et al. | |

FOREIGN PATENT DOCUMENTS

| | | | |
|---|---|---|---|
| JP | 2013-135592 | 7/2013 | |
| JP | 2017-94279 | 6/2017 | |
| WO | 2014/084183 | 6/2014 | |
| WO | WO-2014084183 A1 * | 6/2014 | H02N 2/163 |

OTHER PUBLICATIONS

International Search Report of PCT application No. PCT/JP2021/004507 dated Apr. 13, 2021.

* cited by examiner

ULTRASONIC SENSOR

TECHNICAL FIELD

The present invention relates to an ultrasonic sensor that transmits and receives ultrasonic waves.

BACKGROUND ART

When the difference in acoustic impedance between two different substances in contact with each other is small, an ultrasonic wave can pass through an interface between the two substances and propagates from one of the substances to the other. The acoustic impedance is a numerical value represented by the product of the density of a substance and the sound speed of the substance. When, however, the difference in acoustic impedance between two substances in contact with each other is very large, a larger portion of an ultrasonic wave reflects at an interface than a portion of the ultrasonic wave that propagates. Thus, the efficiency of ultrasonic energy propagation in two substances in contact with each other is higher for substances of which difference in acoustic impedance is smaller.

However, a piezoelectric element used in an ultrasonic sensor is generally made of ceramics having a relatively high density and a relatively high sound speed. The density and sound speed of a gas such as air in which an ultrasonic wave propagates are significantly smaller than the density and sound speed of ceramics. Thus, the efficiency of ultrasonic energy propagation from a piezoelectric element to air is very low.

To solve this problem, such a measure has been taken that an acoustic matching layer having an acoustic impedance smaller than the acoustic impedance of a piezoelectric element but larger than the acoustic impedance of air is interposed between the piezoelectric element and a gas. This raises the efficiency of ultrasonic energy propagation.

From a viewpoint of acoustic impedance, the efficiency of ultrasonic energy propagation from a piezoelectric element to a gas through an acoustic matching layer takes the maximum value when the acoustic impedances of the substances satisfy the relationship represented by the following Formula (1).

$$Z2^{\wedge}2=Z1\times Z3 \qquad (1)$$

In Formula (1), Z1 is the acoustic impedance of the piezoelectric element, Z2 is the acoustic impedance of the acoustic matching layer, and Z3 is the acoustic impedance of the gas.

Furthermore, to propagate an ultrasonic wave generated by a piezoelectric element in a gas with high efficiency, the energy loss of the ultrasonic wave propagating through the acoustic matching layer needs to be suppressed to a low level. A factor causing the energy loss of the ultrasonic wave propagating in the acoustic matching layer is dissipation of ultrasonic energy in the form of heat due to plastic deformation of the acoustic matching layer. Accordingly, to suppress the energy loss of the ultrasonic wave propagating in the acoustic matching layer to a low level, it is desirable that the substance used for the acoustic matching layer has high elasticity.

However, as shown in Formula (1), the value of acoustic impedance Z2 of the acoustic matching layer needs to be reduced to bring acoustic impedance Z2 closer to acoustic impedance Z3 of the gas. Substances having low acoustic impedances are substances having a low sound speed and a low density, and in general, many of such substances deform easily. Such substances are not suitable for acoustic matching layers. Specifically, a piezoelectric element, which is a solid, and a gas have acoustic impedances of which values differ by about five orders of magnitude. Thus, to satisfy Formula (1), the acoustic impedance of the acoustic matching layer needs to be reduced to a value that differs from the acoustic impedance of the piezoelectric element by about three orders of magnitude.

In this regard, studies have been made for an acoustic matching layer having two layers to cause an ultrasonic wave to propagate from a piezoelectric element to a gas with high efficiency. Here, an acoustic matching layer that is in contact with a gas and emits an ultrasonic wave into a gas is defined as a second acoustic matching layer, and an acoustic matching layer that is in contact with both the second acoustic matching layer and a piezoelectric element is defined as a first acoustic matching layer. The efficiency of ultrasonic energy propagation from the piezoelectric element to the gas through the first acoustic matching layer and the second acoustic matching layer takes the maximum value when the acoustic impedances of the substances satisfy the relationship represented by the following Formula (2) and Formula (3) derived from Formula (1).

$$Z2A2=Z1\times Z3 \qquad (2)$$

$$Z3A2=Z2\times Z4 \qquad (3)$$

In Formula (2) and Formula (3), Z1 is the acoustic impedance of the piezoelectric element, Z2 is the acoustic impedance of the first acoustic matching layer, and Z3 is the acoustic impedance of the second acoustic matching layer, and Z4 is the acoustic impedance of the gas.

Since an ultrasonic wave reflects at an interface where two different substances having acoustic impedances that greatly differ from each other are in contact with each other, it is desirable that the magnitudes of the acoustic impedances of the substances satisfy the following relationship.

piezoelectric element>first acoustic matching layer>second acoustic matching>gas To realize such a low acoustic impedance and a high propagation efficiency of ultrasonic energy, a very lightweight and hard material is used for the acoustic matching layer. To realize such control of density, in many cases for example, a hollow filler is mixed in a resin material or a foamed resin is used.

CITATION LIST

Patent Literature

PTL 1: Unexamined Japanese Patent Publication No. 2003-259491

SUMMARY OF THE INVENTION

Patent Literature 1 discloses a composition as a material for an acoustic matching layer, where the composition contains carbodiimide resin as a main component and inorganic hollow bodies or inorganic hollow bodies and a reactive resin. Patent Literature 1 describes that this composition can be used for producing an ultrasonic sensor whose performance is less likely to deteriorate under high humidity since the carbodiimide resin has low moisture absorbency and the carbodiimide resin and the inorganic hollow bodies adhere well to each other.

However, the production process requires a high-temperature and long-time curing reaction step at 200° C. and one hour. The curing process may cause variation in density among products.

According to the present invention, a thermoplastic resin is injection molded to simplify the production process, a predetermined amount of an inorganic filler is mixed in the thermoplastic resin to produce an acoustic matching layer of which properties varies by a little amount under an environment susceptible to humidity, and thus a highly reliable ultrasonic sensor can be produced.

An ultrasonic sensor of the present invention includes at least a piezoelectric element and a plurality of acoustic matching layers laminated and bonded to each other. A plurality of the acoustic matching layers includes a first acoustic matching layer adjacent to the piezoelectric element. The first acoustic matching layer includes a thermoplastic resin and an inorganic filler, and the weight percentage of the inorganic filler in the first acoustic matching layer is less than or equal to 30%. The inorganic filler includes a needle-shaped filler and a hollow filler, and the weight percentage of the hollow filler in the inorganic filler is less than or equal to 50%. By using a thermoplastic resin having such a composition, an acoustic matching layer can be easily produced by injection molding, and an ultrasonic sensor having a high humidity resistance can be produced.

The first acoustic matching layer including the thermoplastic resin with a specified blending percentage of the inorganic filler can be produced by injection molding, which is a simple production method, and variation in density, for example, is very small. By specifying the blending percentage of the inorganic filler, which is a constituent component of the thermoplastic resin, the moisture absorption amount of the acoustic matching layer can be reduced even under a high-humidity environment. As a result, an ultrasonic sensor that is hardly affected by humidity change can be provided.

DESCRIPTION OF EMBODIMENT

In industries related to this technology, very lightweight and hard materials have been studied to develop acoustic matching layers used for ultrasonic sensors. To reduce the weight of the acoustic matching layer, it has become typical to study blending of a hollow filler in a material. The inventors of the present application have conceived an idea through studies on weight reduction of the acoustic matching layer using a hollow filler. To realize the idea, a hollow filler needs to be injected in a material by a high proportion. The inventors of the present application have found that injecting a hollow filler in a material by a high proportion results in a change in characteristics of an ultrasonic sensor under an environment that causes much moisture absorption. The present inventors have constructed the subject matter of the present invention to solve the problem.

Hereinafter, exemplary embodiments of an ultrasonic sensor of the present invention will be described in detail with reference to the drawings. Unnecessary detailed description may be omitted. For example, detailed description of well-known matters and repeated description of substantially the same configuration may be omitted. This is to avoid the following description being unnecessarily redundant and to facilitate understanding of a person skilled in the art. The attached drawings and exemplary embodiments described below are provided to present examples of the present disclosure so as those skilled in the art to fully understand the present disclosure, and are not provided with an intention to limit the subject matter described in the claims. The drawings are not always exactly illustrated, and are schematic diagrams simplified as appropriate so that the present disclosure can be easily understood.

First Exemplary Embodiment

Figure 1:
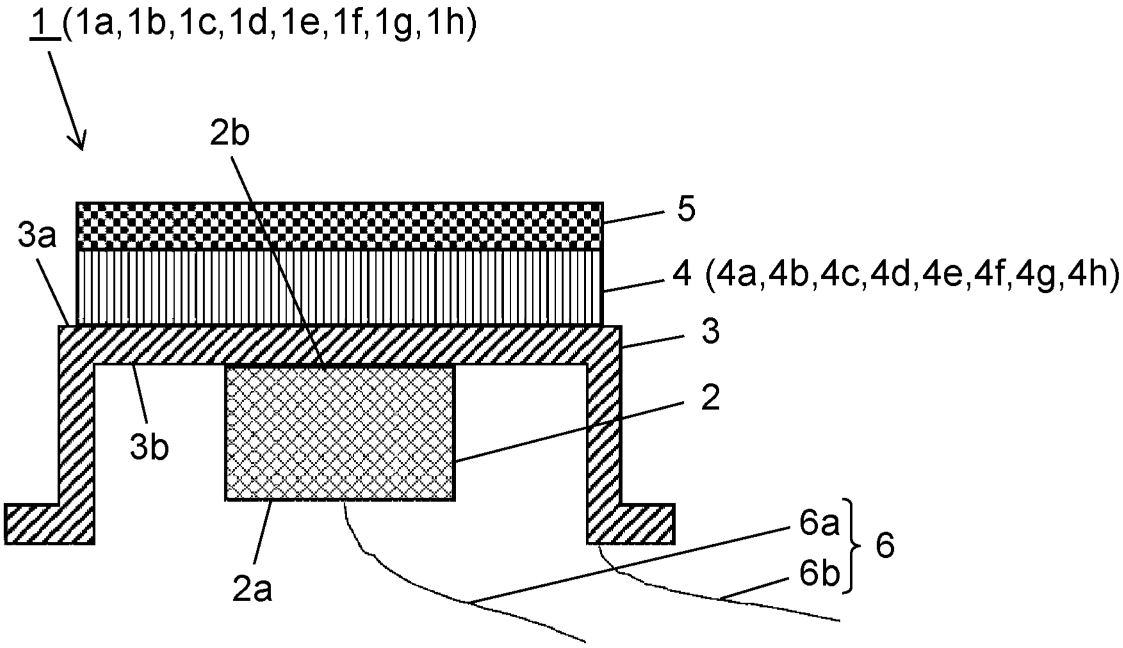
FIG. 1 is a sectional view schematically illustrating an example of a configuration of an ultrasonic sensor according to a first exemplary embodiment.

FIG. 1 is a sectional view schematically illustrating an example of a configuration of ultrasonic sensor 1 according to a first exemplary embodiment. Ultrasonic sensor 1 includes piezoelectric element 2, first acoustic matching layer 4, and second acoustic matching layer 5. Piezoelectric element 2 includes a piezoelectric ceramic and is polarized in a thickness direction. Piezoelectric element 2 is bonded to inner surface **3*b* of metal housing 3** having a bottomed sleeve shape.

Among electrodes **2*a* and 2*b* on both surfaces of piezoelectric element 2, electrode 2*a* is extended to wiring 6*a*, and electrode 2*b* is extended to wiring 6*b* through metal housing 3. First acoustic matching layer 4 includes a mixture of a thermoplastic resin and an inorganic filler, and is bonded to outer surface 3*a* of a top panel of metal housing 3. Furthermore, second acoustic matching layer 5 is bonded to first acoustic matching layer 4**.

With first acoustic matching layer 4 and second acoustic matching layer 5 being laminated, mechanical vibration of piezoelectric element 2 excited by a driving AC voltage applied to electrodes **2*a* and 2*b* from an electric circuit (not illustrated) via wirings 6*a* and 6*b* is efficiently emitted as an ultrasonic wave into an external fluid. Furthermore, an ultrasonic wave that has reached piezoelectric element 2** is efficiently converted into a voltage.

First acoustic matching layer 4 of the present invention includes a mixture of a thermoplastic resin and an inorganic filler that secures strength. Second acoustic matching layer 5 includes, to acoustically match with a gas, a material having a small acoustic impedance. From the results of matching of acoustic impedance between first acoustic matching layer 4 and second acoustic matching layer 5 and acoustic simulation, it is found that the density of first acoustic matching layer 4 needs to be equal to or more than 0.6 g/cm^3 and less than or equal to 1.6 g/cm^3.

Meanwhile, to reduce internal loss in ultrasonic propagation, the density of first acoustic matching layer 4 is required to be large enough to reduce the internal loss. Accordingly, the lower limit of the density of first acoustic matching layer 4 is determined. Furthermore, to secure heat resistance of first acoustic matching layer 4, the blending amount of the inorganic filler mixed in the thermoplastic resin needs to be set so that a predetermined heat resistance condition is satisfied and the density of the entire first acoustic matching layer 4 falls within a predetermined range. For these reasons, in the present disclosure, the inorganic filler is mixed in the thermoplastic resin by a weight fraction less than or equal to 30%. In first to seventh examples described below, the weight fraction of the inorganic filler to the thermoplastic resin is 22%. Furthermore, in the first to seventh examples described below, the inorganic filler is composed of a needle-shaped filler and a hollow filler and weight fractions of the needle-shaped filler and the hollow filler are used as parameters to change the density of first acoustic matching layer 4.

A material of first acoustic matching layer 4 is required to have thermoplasticity so that the material can be molded by fluidity of resin in a molding process. Such materials include, for example, resins such as a hard urethane resin, a polyphenylene sulfide (PPS) resin, a polyoxymethylene (POM) resin, an acrylonitrile butadiene styrene (ABS) resin, a liquid crystal polymer, and a polystyrene (PS) resin. As the inorganic filler mixed in the thermoplastic resin, a mixture of a needle-shaped filler and a hollow filler is used. Accordingly, the density of the material can be controlled. An example of the needle-shaped filler is glass fiber. Examples of the hollow filler includes glass or ceramic hollow balloons.

Examples of a material suitable for second acoustic matching layer 5 include, in consideration of matching of acoustic impedance between the gas and the piezoelectric element, a hard resin foam that is a foamed resin having a closed pore structure and includes a plurality of holes and walls adjacent to the holes. Examples of the hard resin foam include a hard acrylic foam, a hard vinyl chloride foam, a hard polypropylene foam, a hard polymethacrylimide foam, and a hard urethane foam.

Examples of the hard acrylic foam include FOAMAC (registered trademark) available from Sekisui Kasei Co., Ltd., examples of the hard vinyl chloride foam includes NAVICEL (registered trademark) available from JFC Inc., examples of the hard polypropylene foam include Zetron (registered trademark) available from Sekisui Chemical Co., Ltd., and examples of the hard polymethacrylimide foam include ROHACELL (registered trademark) available from Daicel-Evonik Ltd. These are commercially available.

Ultrasonic sensor 1 of the present exemplary embodiment can be produced, for example, by the following procedure.

First, metal housing 3, piezoelectric element 2, first acoustic matching layer 4, and second acoustic matching layer 5 are prepared. First acoustic matching layer 4 and second acoustic matching layer 5 are processed in advance to have predetermined thicknesses. Piezoelectric element 2 is bonded to inner surface 3*b* of the top panel of metal housing 3 with an adhesive or the like. First acoustic matching layer 4 is bonded to outer surface 3*a* of the top panel of metal housing 3, and second acoustic matching layer 5 is then bonded to first acoustic matching layer 4. Thereafter, wiring 6*a* is connected to piezoelectric element 2, and wiring 6*b* is connected to metal housing 3. In this manner, an ultrasonic sensor is completed. Note that, adhesion by an epoxy resin is used, for example, as the method of bonding metal housing 3 and first acoustic matching layer 4 to each other and the method of bonding first acoustic matching layer 4 and second acoustic matching layer 5 to each other.

EXAMPLES

A plurality of ultrasonic sensors 1 according to the first exemplary embodiment is produced in different modes and their characteristics were examined. The result of the examination will be described below. In the followings, ultrasonic sensor 1 and first acoustic matching layer 4 are mentioned according to the mode of production as ultrasonic sensor 1*a*, 1*b*, 1*c*, 1*d*, 1*e*, 1*f*, 1*g*, 1*h* and first acoustic matching layer 4*a*, 4*b*, 4*c*, 4*d*, 4*e*, 4*f*, 4*g*, 4*h*.

1. Preparation of Samples

First Example

As a first example, ultrasonic sensor 1*a* described below was manufactured.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*a*, a liquid crystal polymer blended with a mixture of a needle-shaped glass fiber and hollow glass balloons as an inorganic filler was used. The weight percentage of the liquid crystal polymer, the glass fiber, and the glass balloons in the mixture is 77:5:17. A pellet formed by blending the materials with this percentage was molded into a disk shape having a thickness of 1.0 mm and a diameter of 10 mm by injection molding to produce first acoustic matching layer 4*a*. The density of the material was 1.20 g/cm^3. Then, first acoustic matching layer 4*a* was bonded to metal housing 3 to which piezoelectric element 2 was fixed, and second acoustic matching layer 5 was laminated and bonded to first acoustic matching layer 4*a*. In this manner, ultrasonic sensor 1*a* including piezoelectric element 2, metal housing 3, first acoustic matching layer 4*a*, and second acoustic matching layer 5 was produced.

Second Example

As a second example, ultrasonic sensor 1*b* described below was produced.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*b*, a liquid crystal polymer blended with a mixture of a needle-shaped glass fiber and hollow glass balloons as an inorganic filler was used. The weight percentage of the liquid crystal polymer, the glass fiber, and the glass balloons in the mixture is 77:7:15. A pellet formed by blending the materials with this percentage was molded into a disk shape having a thickness of 1.0 mm and a diameter of 10 mm by injection molding to produce first acoustic matching layer 4*b*. The density of the material was 1.23 g/cm^3. Then, first acoustic matching layer 4*b* was bonded to metal housing 3 to which piezoelectric element 2 was fixed, and second acoustic matching layer 5 was laminated and bonded to first acoustic matching layer 4*b*. In this manner, ultrasonic sensor 1*b* including piezoelectric element 2, metal housing 3, first acoustic matching layer 4*b*, and second acoustic matching layer 5 was produced.

Third Example

As a third example, ultrasonic sensor 1*c* described below was produced.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*c*, a liquid crystal polymer blended with a mixture of a needle-shaped glass fiber and hollow glass balloons as an inorganic filler was used. The weight percentage of the liquid crystal polymer, the glass fiber, and the glass balloons in the mixture is 77:13:9. A pellet formed by blending the materials with this percentage was molded into a disk shape having a thickness of 1.0 mm and a diameter of 10 mm by injection molding to produce first acoustic matching layer 4*c*. The density of the material was 1.30 g/cm^3. Then, first acoustic matching layer 4*c* was bonded to metal housing 3 to which piezoelectric element 2 was fixed, and second acoustic matching layer 5 was laminated and bonded to first acoustic matching layer 4*c*. In this manner, ultrasonic sensor 1*c* including piezoelectric element 2, metal housing 3, first acoustic matching layer 4*c*, and second acoustic matching layer 5 was produced.

Fourth Example

As a fourth example, ultrasonic sensor 1*d* described below was produced.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*d*, a liquid crystal polymer blended with a mixture of a needle-shaped glass fiber and hollow glass balloons as an inorganic filler was used. The weight percentage of the liquid crystal polymer, the glass fiber, and the glass balloons in the mixture is 77:15:7. A pellet formed by blending the materials with this percentage was molded into a disk shape having a thickness of 1.0 mm and a diameter of 10 mm by injection molding to produce first acoustic matching layer 4*d*. The density of the material was 1.35 g/cm^3. Then, first acoustic matching layer 4*d* was bonded to metal housing 3 to which piezoelectric element 2 was fixed, and second acoustic matching layer 5 was laminated and bonded to first acoustic matching layer 4*d*. In this manner, ultrasonic sensor 1*d* including piezoelectric element 2, metal housing 3, first acoustic matching layer 4*d*, and second acoustic matching layer 5 was produced.

Fifth Example

As a fifth example, ultrasonic sensor 1*e* described below was produced.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*e*, a liquid crystal polymer blended with a mixture of a needle-shaped glass fiber and hollow glass balloons as an inorganic filler was used. The weight percentage of the liquid crystal polymer, the glass fiber, and the glass balloons in the mixture is 77:18:4. A pellet formed by blending the materials with this percentage was molded into a disk shape having a thickness of 1.0 mm and a diameter of 10 mm by injection molding to produce first acoustic matching layer 4*e*. The density of the material was 1.40 g/cm^3. Then, first acoustic matching layer 4*e* was bonded to metal housing 3 to which piezoelectric element 2 was fixed, and second acoustic matching layer 5 was laminated and bonded to first acoustic matching layer 4*e*. In this manner, ultrasonic sensor 1*e* including piezoelectric element 2, metal housing 3, first acoustic matching layer 4*e*, and second acoustic matching layer 5 was produced.

Sixth Example

As a sixth example, ultrasonic sensor 1*f* described below was produced.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*f*, a liquid crystal polymer blended with a mixture of a needle-shaped glass fiber and hollow glass balloons as an inorganic filler was used. The weight percentage of the liquid crystal polymer, the glass fiber, and the glass balloons in the mixture is 77:21:1. A pellet formed by blending the materials with this percentage was molded into a disk shape having a thickness of 1.0 mm and a diameter of 10 mm by injection molding to produce first acoustic matching layer 4*f*. The density of the material was 1.50 g/cm^3. Then, first acoustic matching layer 4*f* was bonded to metal housing 3 to which piezoelectric element 2 was fixed, and second acoustic matching layer 5 was laminated and bonded to first acoustic matching layer 4*f*. In this manner, ultrasonic sensor 1*f* including piezoelectric element 2, metal housing 3, first acoustic matching layer 4*f*, and second acoustic matching layer 5 was produced.

Seventh Example

As a seventh example, ultrasonic sensor 1*g* described below was produced.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*g*, a liquid crystal polymer blended with a needle-shaped glass fiber as an inorganic filler was used. No glass balloon was added to this mixture. Thus, the weight percentage of the liquid crystal polymer, the glass fiber, and the glass balloons in the mixture is 77:22:0. A pellet formed by blending the materials with this percentage was molded into a disk shape having a thickness of 1.0 mm and a diameter of 10 mm by injection molding to produce first acoustic matching layer 4*g*. The density of the material was 1.60 g/cm^3. Then, first acoustic matching layer 4*g* was bonded to metal housing 3 to which piezoelectric element 2 was fixed, and second acoustic matching layer 5 was laminated and bonded to first acoustic matching layer 4*g*. In this manner, ultrasonic sensor 1*g* including piezoelectric element 2, metal housing 3, first acoustic matching layer 4*g*, and second acoustic matching layer 5 was produced.

First Comparative Example

As a first comparative example, ultrasonic sensor 1*h* described below was produced.

As piezoelectric element 2, lead zirconate titanate having a rectangular parallelepiped shape with a thickness of 2.65 mm, a long axis length of 7.4 mm, and a short axis length of 3.55 mm was used. Piezoelectric element 2 has a groove in the long axis direction. As an adhesive, an epoxy adhesive that is liquid at room temperature and solidifies by heating was used. Metal housing 3 made of SUS 304 having a thickness of 0.2 mm was used. A polymethacrylimide foamed resin was used as second acoustic matching layer 5. A polymethacrylimide foamed resin processed into a disk shape having a density of 0.07 g/cm^3 and dimensions of 10 mm in diameter and 0.75 mm in thickness was used as second acoustic matching layer 5.

As a material for forming first acoustic matching layer 4*h*, a liquid crystal polymer containing no inorganic filler was used. Thus, the weight percentage of the liquid crystal polymer, the glass fiber, and the glass balloon in the material is 100:0:0. A pellet formed by blending the materials with this percentage was molded into a disk shape having a thickness of 1.0 mm and a diameter of 10 mm by injection molding to produce first acoustic matching layer 4*h*. The density of the material was 1.45 g/cm^3. Then, first acoustic matching layer 4*h* was bonded to metal housing 3 to which piezoelectric element 2 was fixed, and second acoustic matching layer 5 was laminated and bonded to first acoustic matching layer 4*h*. In this manner, ultrasonic sensor 1*h* including piezoelectric element 2, metal housing 3, first acoustic matching layer 4*h*, and second acoustic matching layer 5 was produced.

2. Evaluation of Characteristics

First, the moisture absorption amount of each of first acoustic matching layers 4*a*, 4*b*, 4*c*, 4*d*, 4*e*, 4*f*, 4*g*, 4*h* produced by injection molding was measured. Specifically, first acoustic matching layers 4*a*, 4*b*, 4*c*, 4*d*, 4*e*, 4*f*, 4*g*, 4*h* produced under the respective conditions described above were put in a thermo-hygrostat at 70° C. and 95% for 100 hours. Then, the weights of first acoustic matching layers 4*a*, 4*b*, 4*c*, 4*d*, 4*e*, 4*f*, 4*g*, 4*h* before and after they were put in the thermo-hydrostat were measured, and the moisture absorption amount was calculated from the change in weight. Next, ultrasonic sensors 1*a*, 1*b*, 1*c*, 1*d*, 1*e*, 1*f*, 1*g*, 1*h* produced respectively using first acoustic matching layers 4*a*, 4*b*, 4*c*, 4*d*, 4*e*, 4*f*, 4*g*, 4*h* were put in a thermo-hygrostat with the same condition as described above for the same time, and for each sensor, impedance waveforms before and after putting the ultrasonic sensor in the thermo-hygrostat were compared to measure the shift amount of frequency. Ultrasonic sensor 1 of which shift amount is less than or equal to 10 kHz was labelled as "○", and ultrasonic sensor 1 of which shift amount is equal to or more than 10 kHz was labelled as "x". In the measurement of heat resistance characteristics, 200 cycles of thermal shock testing were performed for each of ultrasonic sensors 1*a*, 1*b*, 1*c*, 1*d*, 1*e*, 1*f*, 1*g*, 1*h*. In each cycle of the thermal shock testing, the ultrasonic sensor was put in a thermostatic chamber at −40° C. for 30 minutes and in a thermostatic chamber at 80° C. for 30 minutes. Then, for each of ultrasonic sensors 1*a*, 1*b*, 1*c*, 1*d*, 1*e*, 1*f*, 1*g*, 1*h*, sensor sensitivities before and after the thermal shock testing were compared to see the change in sensor sensitivity. Ultrasonic sensor 1 that showed a change in sensitivity equal to or more than 20% was labeled as "x", and ultrasonic sensor 1 that showed a change in sensitivity less than 20% was labeled as "○".

The moisture absorption amount, the shift amount of impedance, and the determination results of heat resistance characteristics are shown in Table 1. In Table 1, the percentage of the inorganic filler in the compounded composition and the hollow structure percentage of the inorganic filler are also shown. Listed in the column of "FIRST EXAMPLE" in Table 1 are numerical values regarding first acoustic matching layer 4*a* produced in the first example described above, and the determination result for ultrasonic sensor 1*a* including first acoustic matching layer 4*a*. The same applies to the second to seventh examples and the first comparative example. In Table 1, calculation results of moisture absorption amount are listed in the row of "MOISTURE ABSORPTION AMOUNT (g)", determination results of the shift amount of frequency are listed in the row of "MOISTURE ABSORPTION RESISTANCE (DETERMINATION RESULT)", and determination results of the change in sensitivity of sensor are listed in the row of "HEAT RESISTANCE CHARACTERISTICS (DETERMINATION RESULT)".

TABLE 1

| | Level | First example | Second example | Third example | Fourth example | Fifth example | Sixth example | Seventh example | First comparative example |
|---|---|---|---|---|---|---|---|---|---|
| Compounded composition | Resin | 77 | 77 | 77 | 77 | 77 | 77 | 77 | 100 |
| | Inorganic filler of needle-shaped structure | 5 | 7 | 13 | 15 | 18 | 21 | 22 | 0 |
| | Inorganic filler of hollow structure | 17 | 15 | 9 | 7 | 4 | 1 | 0 | 0 |
| Filler percentage | Inorganic filler percentage (%) | 22 | 22 | 22 | 22 | 22 | 22 | 22 | 0 |
| | Hollow structure percentage of inorganic filler (%) | 77 | 68 | 41 | 32 | 18 | 5 | 0 | 0 |
| Density (g/cm$^3$) | | 1.20 | 1.23 | 1.30 | 1.35 | 1.40 | 1.50 | 1.60 | 1.45 |
| Heat resistance characteristics (determination result) | | ○ | ○ | ○ | ○ | ○ | ○ | ○ | x |
| Moisture absorption amount (g) | | 0.64 | 0.59 | 0.48 | 0.40 | 0.32 | 0.17 | 0.01 | 0.04 |
| Moisture absorption resistance (determination result) | | x | x | ○ | ○ | ○ | ○ | ○ | ○ |

3. Discussion of Results

Figure 2:
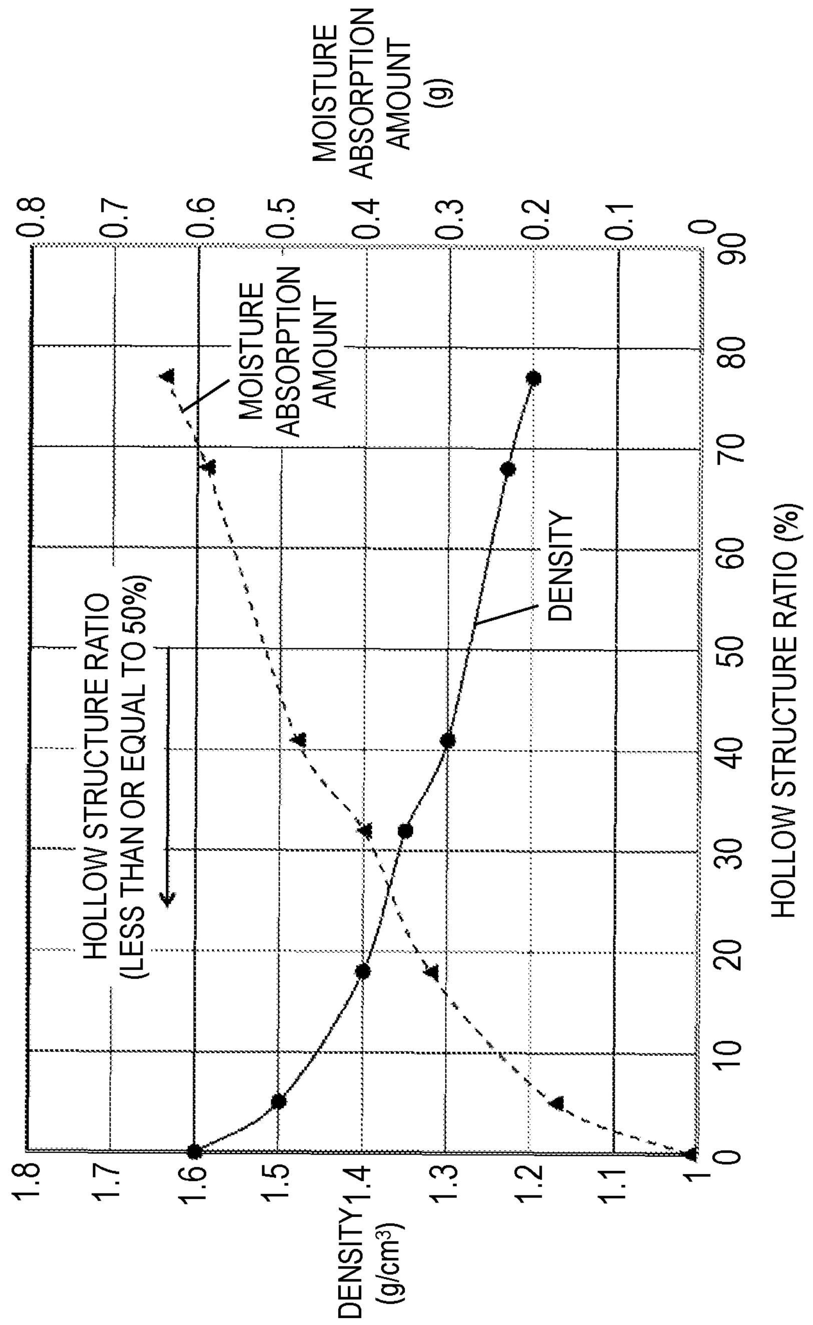
FIG. 2 is a chart illustrating the density and moisture absorption amount of a first acoustic matching layer with respect to the hollow structure percentage of an inorganic filler in a compounded composition that forms the first acoustic matching layer in examples of the ultrasonic sensor according to the first exemplary embodiment.

FIG. 2 is a chart illustrating the density and moisture absorption amount of first acoustic matching layer 4 with respect to the hollow structure percentage of the inorganic filler in the compounded composition forming first acoustic matching layer 4 for each example listed in Table 1. In FIG. 2, the horizontal axis represents the hollow structure percentage of the inorganic filler in the compounded composition forming first acoustic matching layer 4, and the vertical axes represents the density and moisture absorption amount of first acoustic matching layer 4.

As shown in Table 1 and FIG. 2, the moisture absorption amount of first acoustic matching layer 4 is related to the percentage of hollow filler in the inorganic filler (shown as HOLLOW STRUCTURE PERCENTAGE (%) in Table 1 and FIG. 2) in the compounded composition forming first acoustic matching layer 4, and such a trend is observed that the moisture absorption amount is smaller for a smaller percentage of hollow filler. Meanwhile, it is confirmed that the moisture absorption resistance (impedance shift amount) of the ultrasonic sensor has a correlation with the moisture absorption amount. From these results, it is found that by introducing the filler having a hollow structure into first acoustic matching layer 4, the moisture absorption amount increases and the moisture absorption resistance (impedance shift amount) of the ultrasonic sensor also deteriorates. From the determination results in Table 1, it is found that a preferable percentage of the filler having a hollow structure in the inorganic filler is less than or equal to 50%. In this case, the density of first acoustic matching layer 4 can be set to take a value from 1.25 g/cm^3 to 1.60 g/cm^3, which satisfies the above-described required density condition.

In first acoustic matching layer 4*g* (ultrasonic sensor 1*g*) of the seventh example in which the percentage of the filler having a hollow structure in the inorganic filler (hollow structure percentage) is set to 0% to reduce moisture absorption amount, the moisture absorption amount is small and the shift amount of impedance is not a problem but the density is as high as the upper limit of 1.6 g/cm^3. To improve the performance of propagating a sound wave from the ultrasonic sensor more than the upper limit of density, the weight percentage of the hollow filler in the inorganic filler is desirably equal to or more than 1%. In first acoustic matching layer 4*h* (ultrasonic sensor 1*h*) of the first comparative example in which the percentage of inorganic filler is set to 0%, the density satisfies the condition but the determination result of heat resistance characteristics is "x". Thus, from the viewpoint of improving heat resistance, the weight percentage of the inorganic filler in first acoustic matching layer 4 is desirably equal to or more than 10%.

From these results, it is found that by at least adding the inorganic filler to first acoustic matching layer 4 by a weight percentage of less than or equal to 30% and setting the weight percentage of the filler having a hollow structure in the inorganic filler to less than or equal to 50%, ultrasonic sensor 1 having excellent moisture absorption resistance can be obtained without adversely affecting heat resistance characteristics. The percentage of the inorganic filler in first acoustic matching layer 4 and the percentage of the filler having a hollow structure in the inorganic filler can be appropriately selected within the range described above according to sensitivity, heat resistance, and moisture absorbency required for the ultrasonic sensor.

As described above, the ultrasonic sensor according to the first disclosure includes at least a piezoelectric element, and a plurality of acoustic matching layers laminated and bonded to each other, where the plurality of acoustic matching layers includes a first acoustic matching layer adjacent to the piezoelectric element, the first acoustic matching layer includes a thermoplastic resin and an inorganic filler, a weight percentage of the inorganic filler in the first acoustic matching layer is less than or equal to 30%, the inorganic filler includes a needle-shaped filler and a hollow filler, and a weight percentage of the hollow filler in the inorganic filler is less than or equal to 50%.

The ultrasonic sensor according to a second disclosure is the ultrasonic sensor of the first disclosure in which the thermoplastic resin is a liquid crystal polymer.

INDUSTRIAL APPLICABILITY

As described above, an ultrasonic sensor according to the present invention is suitably used for flow rate meters for measuring various fluids. In particular, the ultrasonic sensor according to the present invention is suitably used for applications requiring excellent durability in use environments such as under high temperature and low temperature.

REFERENCE MARKS IN THE DRAWINGS

1, 1*a*, 1*b*, 1*c*, 1*d*, 1*e*, 1*f*, 1*g*, 1*h*: ultrasonic sensor
2: piezoelectric element
2*a*, 2*b*: electrode
3: metal housing
3*a*: outer surface
3*b*: inner surface
4, 4*a*, 4*b*, 4*c*, 4*d*, 4*e*, 4*f*, 4*g*, 4*h*: first acoustic matching layer
5: second acoustic matching layer
6, 6*a*, 6*b*: wiring

The invention claimed is:

1. An ultrasonic sensor comprising:

a piezoelectric element; and a plurality of acoustic matching layers laminated and bonded to each other, wherein the plurality of acoustic matching layers includes a first acoustic matching layer adjacent to the piezoelectric element, the first acoustic matching layer includes a thermoplastic resin and an inorganic filler, a weight percentage of the inorganic filler in the first acoustic matching layer is less than or equal to 30% with respect to a total weight of the first acoustic matching layer, the inorganic filler includes a needle-shaped filler and a hollow filler, and a weight percentage of the hollow filler in the inorganic filler is less than or equal to 50% with respect to a total weight of the inorganic filler.

2. The ultrasonic sensor according to claim 1, wherein the thermoplastic resin is a liquid crystal polymer.

3. The ultrasonic sensor according to claim 1, wherein the weight percentage of the inorganic filler in the first acoustic matching layer is less than or equal to 30% and greater than or equal to 10% with respect to the total weight of the first acoustic matching layer.

4. The ultrasonic sensor according to claim 1, wherein the weight percentage of the hollow filler in the inorganic filler is less than or equal to 50% and greater than or equal to 1% with respect to the total weight of the inorganic filler.

5. The ultrasonic sensor according to claim 1, further comprising a housing, wherein the first acoustic matching layer is arranged on an upper surface of a top panel of the housing, and the piezoelectric element is arranged on a lower surface of the top panel of the housing.

6. The ultrasonic sensor according to claim 5, wherein the plurality of acoustic matching layers includes a second acoustic matching layer arranged on an upper surface of the first acoustic matching layer.

* * * * *